United States Patent Office 2,728,766
Patented Dec. 27, 1955

2,728,766

TRINUCLEAR MEROCYANINE DYES CONTAINING A CHAIN ALKOXYL GROUP

Edward B. Knott, Harrow, England, assignor to Eastman Kodak Company, Rochester, N. Y., a corporation of New Jersey No Drawing. Application March 20, 1953,
Serial No. 343,809

11 Claims. (Cl. 260—240.1)

This invention relates to merocyanine dyes containing a chain substituent. More particularly, this invention relates to complex merocyanine dyes containing an alkoxyl substituent on the intercyclic chain connecting two of the heterocyclic nuclei.

Certain merocarbocyanine dyes containing an alkoxyl substituent on the chain have been previously described. See, for example, Brooker and White U. S. Patents 2,478,366, issued August 9, 1949, and 2,494,031, issued January 10, 1950. However, complex merocyanine dyes containing an alkoxyl substituent have not been previously described.

I have now found a new class of complex merocyanine dyes containing an alkoxyl group attached to one of the carbon atoms of the intercyclic chain.

It is, accordingly, an object of my invention to provide new complex merocyanine dyes. Still another object is to provide a method for making these new dyes. Another object is to provide photographic silver halide emulsions sensitized with my new dyes. Other objects will become apparent from a consideration of the following description and examples.

The new complex merocyanine dyes of my invention can advantageously be represented by the following general formula:

I

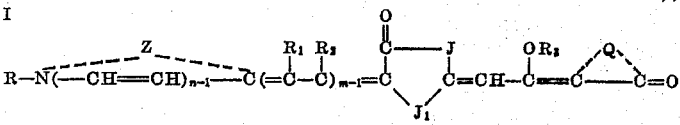

wherein R and R₃, each represents an alkyl group, such as methyl, ethyl, n-propyl, etc. (e. g. an alkyl group of the formula $C_nH_{2n+1}$ wherein $n$ is a positive integer of from 1 to 3), R₁ represents a member selected from the group consisting of a hydrogen atom and an alkyl group, such as methyl, ethyl, n-propyl, etc. (e. g. an alkyl group of the formula $C_nH_{2n+1}$ wherein $n$ represents a positive integer of from 1 to 3), R₂ represents a member selected from the group consisting of a hydrogen atom, an alkyl group, such as methyl, ethyl, n-propyl, etc. (e. g. an alkyl group of the formula $C_nH_{2n+1}$ wherein $n$ is a positive integer of from 1 to 3), an aryl group, such as phenyl, o-, m-, and p-tolyl, etc. (e. g. a monocyclic aryl group) and an alkoxyl group, such as methoxyl, ethoxyl, etc., J and J₁ together represent the non-metallic atoms necessary to complete a thiazolidone nucleus, i. e. a 4-thiazolidone nucleus or a 5-thiazolidone nucleus (i. e. J and J₁ are different from one another and represent a sulfur atom or a

group wherein R₆ represents an alkyl group, such as methyl, ethyl, n-propyl, allyl, carboxymethyl, carbomethoxymethyl, carbethoxymethyl, etc., or an aryl group, such as phenyl, o-, m-, and p-tolyl, etc.), m and n each represents a positive integral of from 1 to 2, Z represents the non-metallic atoms necessary to complete a heterocyclic nucleus containing from five to six atoms in the heterocyclic ring, such as those selected from the group consisting of those of the thiazole series (e. g. thiazole, 4-methylthiazole, 4-phenylthiazole, 5-methylthiazole, 5 - phenylthiazole, 4,5 - dimethylthiazole, 4,5-diphenylthiazole, 4 - (2 - thienyl)thiazole, etc.), those of the benzothiazole series (e. g. benzothiazole, 4-chlorobenzothiazole, 5 - chlorobenzothiazole, 6 - chlorobenzothiazole, 7 - chlorobenzothiazole, 4 - methylbenzothiazole, 5 - methylbenzothiazole, 6 - methylbenzothiazole, 5 - bromobenzothiazole, 6 - bromobenzothiazole, 4 - phenylbenzothiazole, 5 - phenylbenzothiazole, 4 - methoxybenzothiazole, 5 - methoxybenzothiazole, 6 - methoxybenzothiazole, 5 - iodobenzothiazole, 6 - iodobenzothiazole, 4 - ethoxybenzothiazole, 5-ethoxybenzothiazole, tetrahydrobenzothiazole, 5,6 - dimethoxybenzothiazole, 5,6-dioxymethylenebenzothiazole, 5-hydroxybenzothiazole, 6 - hydroxybenzothiazole, etc.), those of the naphthothiazole series (e. g. α-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole, etc.), those of the thianaphtheno-7',6',4,5-thiazole series (e. g. 4'-methoxythianaphtheno-7',6',4,5-thiazole, etc.), those of the oxazole series (e. g. 4-methyloxazole, 5-methyloxazole, 4-phenyloxazole, 4,5 - diphenyloxazole, 4 - ethyloxazole, 4,5-dimethyloxazole, 5-phenyloxazole, etc.), those of the benzoxazole series (e. g. benzoxazole, 5-chlorobenzoxazole, 5 - methylbenzoxazole, 5 - phenylbenzoxazole, 6 - methylbenzoxazole, 5,6 - dimethylbenzoxazole, 4,6-dimethylbenzoaxazole, 5-methoxybenzoxazole, 5-ethoxybenzoxazole, 5 - chlorobenzoxazole, 6 - methoxybenzoxazole, 5-hydroxybenzoxazole, 6-hydroxybenzoxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5 - methoxybenzoselenazole, 5 - hydroxybenzoselenazole, tetrahydrobenzoselenazole, etc.), those of the naphthoselenazole series (e. g. α-naphthoselenazole, β - naphthoselenazole, etc.), those of the thiazoline series e. g. thiazoline, 4-methylthiazoline, etc.), those of the 2-quinoline series (e. g. quinoline, 3 - methylquinoline, 5 - methylquinoline, 7-methylquinoline, 8 - methylquinoline, 6 - chloroquinoline, 8 - chloroquinoline, 6 - methoxyquinoline, 6-ethoxyquinoline, 6 - hydroxyquinoline, 8 - hydroxyquinoline, etc.), those of the 4-quinoline series (e. g. quinoline, 6 - methoxyquinoline, 7 - methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the benzimidazole series (e. g. 1,3-diethylbenzimidazole, 1-ethyl-3-phenylbenzimidazole, etc.), those of the 3,3-dialkylindolenine series (e. g. 3,3-dimethylindolenine, 3,3,5 - trimethylindolenine, 3,3,7 - trimethylindolenine, etc.), the pyridine series (e. g. pyridine, 5-methylpyridine, etc.), etc., and Q represents the nonmetallic atoms necessary to complete a heterocyclic nucleus containing from 5 to 6 atoms in the heterocyclic ring, such as those selected from the group consisting of those of the thiazolone series, for example: those of the 2,4(3,5)-thiazoledione series, such as 2,4(3,5)-thiazoledione, 3-alkyl-2,4(3,5) - thiazoledione (e. g. 3 - ethyl - 2,4(3,5)-thiazoledione, etc.), 3-phenyl-2,4(3,5)-thiazoledione, 3-α - naphthyl - 2,4(3,5) - thiazoledione, etc., those of the 2 - thio - 2,4(3,5) - thiazoledione (rhodanine) series, such as 3 - alkyl - 2 - thio - 2,4(3,5) - thiazoledione (3-alkylrhodanines) (e. g. 3-ethyl-2-thio-2,4(3,5)-thiazoledione (or 3 - ethylrhodanine), 3 - phenyl - 2-thio - 2,4(3,5) - thiazoledione (3 - phenylrhodanine), 3 - α - naphthyl - 2 - thio - 2,4(3,5) - thiazoledione (3-α - naphthylrhodanine), 3 - (1 - benzothiazyl) - 2 - thio- 2,4(3,5) - thiazoledione (3 - (1 - benzothiazyl)rhodanine), etc., those of the 2-alkylmercapto-4(5)-thiazolone series, such as 2 - ethylmercapto - 4(5) - thiazolone, etc., those of the thiozolidone series, such as 4-thiazolidone or its 3-alkyl (e. g. ethyl, etc.), 3-phenyl or 3-α-naphthyl derivatives, those of the 2-alkylphenylamino-4(5)-thiazolone series (e. g. 2-ethylphenylamino-4(5)-thiazolone, etc.), those of the 2-diphenylamino-4(5)-thiazolone series; those of the 5(4)-thiazolone series, such as 2-ethylthio-5(4)-thiazolone, 2-benzylthio-5(4)-thiazolone, etc., those of the oxazolone series, for example: those of the 2-thio-2,4(3,5)-oxazoledione series, such as 3-alkyl-2-thio-2,4(3,5)-oxazoledione (e. g. 3-ethyl-2-thio-2,4(3,5)-oxazoledione, etc.), those of the 2 - imino - 2,4(3,5) - oxazolone (pseudohydantoin) series, etc.; those of the 5(4)-oxazolone series, such as 2-phenyl-5(4)-oxazolone, 2-ethyl-5(4)-oxazolone, etc., those of the 5(4)-isoxazolone series, such as 3-phenyl-5(4)-isoxazolone, etc., those of the imidazolone series, for example: those of the 2,4(3,5)-imidazoledione series, such as 2,4(3,5)-imidazoledione (hydantoin) or its 3-alkyl (e. g. ethyl, etc.), 3-phenyl or 3-α-naphthyl derivatives as well as its 1,3-dialkyl (e. g. 1,3-diethyl, etc.), 1-alkyl-3-phenyl (e. g. 1-ethyl-3-phenyl, etc.), 1-alkyl-3-naphthyl (e. g. 1-ethyl-3-α-naphthyl, etc.), 1,3-diphenyl, etc., derivatives, those of the 2-thio-2,4(3,5)-imidazoledione series, such as 2-thio-2,4(3,5)-imidazoledione (2-thiohydantoin) or its 3-alkyl (e. g. 3-ethyl, etc.), 3-phenyl or 3-α-naphthyl derivatives as well as its 1,3-dialkyl (e. g. 1,3-diethyl, etc.), 1-alkyl-3-phenyl (e. g. 1-ethyl-3-phenyl, etc.), 1-alkyl-3-naphthyl (e. g. 1-ethyl-3-α-naphthyl), 1,3-diphenyl, etc. derivatives, those of the 2-alkylmercapto-5(4)-imidazolone series, such as 2-n-propylmercapto-5(4)-imidazolone; those of the thionaphthenone series, such as 2(1)-thionaphthenone or 1(2)-thionaphthenone; those of the pyrazolone series, such as pyrazolone or its 1-alkyl (e. g. methyl, ethyl, etc.), 1-phenyl, 1-naphthyl (e. g. 1-α-naphthyl), 3-alkyl (e. g. methyl, ethyl, etc.), 3-phenyl, 3-naphthyl (3-α-naphthyl), 1-alkyl-3-phenyl (e. g. 1-methyl-3-phenyl, etc.), 3-alkyl-1-phenyl (e. g. 3-methyl-1-phenyl, etc.), 1,3-dialkyl (e. g. 1,3-diethyl, etc.), 1,3-diphenyl, etc. derivatives; those of the oxindole series, such as 2,3-dihydro-3-ketoindole, and like five-membered heterocyclic nuclei; those of the 2,4,6-triketohexahydropyrimidine series, for example, 2,4,6-triketohexahydropyrimidine (barbituric acid), 2 - thio - 2,4,6 - triketohexahydropyrimidine (2-thiobarbituric acid) as well as their 1-alkyl (e. g. 1-ethyl, etc.) or 1,3-dialkyl (1,3-diethyl, etc.) derivatives; those of the 3,4-dihydro-2(1)-quinolone series, such as 3,4-dihydro-2(1)-quinolone (dihydrocarbostyril); those of the 3,4-dihydro-2(1)-quinoxalone series, such as 3,4-dihydro-2(1)-quinoxalone (oxydihydroquinoxaline), etc.; those of the 3-phenomorpholone (1,4,3-benzoxazine-3(4)-one or benzo-β-morpholone) series, such as 3-phenomorpholone, etc.; those of the 1,4,2-benzothiazine-3(4)-one (ketodihydrobenzoparathiazine) series, such as ketodihydrobenzoparathiazine, etc., and like six-membered heterocyclic nuclei.

In accordance with my invention, I provide the dyes represented by Formula I above by condensing together a compound selected from those represented by the following two general formulas:

II

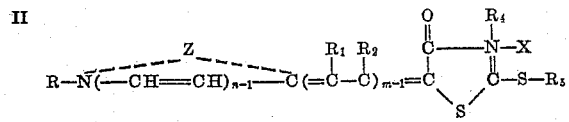

IIa

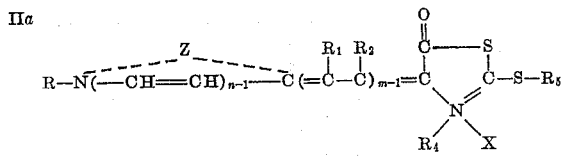

wherein R, $R_1$, $R_2$, Z, m, and n each have the values given above, $R_4$ and $R_5$ each represents an alkyl group, such as methyl, ethyl, allyl, carbethoxymethyl, etc., and X represents an acid radical, such as benzenesulfonate, p-toluenesulfonate, etc., with a compound selected from those represented by the following general formula:

III

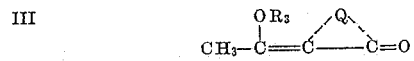

wherein $R_3$ and Q each have the values given above.

The condensation of the compounds of Formula II or IIa with those of Formula III can be carried out in the presence of a basic condensing agent, such as the tri-alkylamines (e. g. triethylamine, tri-n-propylamine, tri-n-butylamine, triisobutylamine, etc.), N-alkylpiperidines (e. g. N-methylpiperidine, N-ethylpiperidine, etc.), N,N-dialkylanilines (e. g. N,N-dimethylaniline, N,N-diethylaniline, etc.), etc. The condensations can advantageously be carried out in the presence of an inert solvent, such as pyridine, lower aliphatic alcohols (e. g. ethanol, n-propanol, n-butanol, etc.), 1,4-dioxane, etc. Heat accelerates the condensations, and temperatures varying from room temperature to the reflux temperature of the reaction mixture can be used.

The intermediates of Formula III above wherein Q represents the non-metallic atoms necessary to complete a heterocyclic nucleus of the 5(4)-oxazolone series can be prepared according to the process described in Ilford British Patent 633,736, accepted December 19, 1949. In general, the intermediates of Formula III above can also be prepared by condensing together an ester selected from those represented by the following general formula:

IV.     $CH_3-CH(OR_3)_3$ wherein $R_3$ has the values given above with an intermediate selected from those represented by the following general formula:

V

wherein Q has the values given above, in the presence of a carboxylic anhydride, such as acetic anhydride, propionic anhydride, etc. The intermediates of Formula III above wherein Q represents the non-metallic atoms necessary to complete a heterocyclic nucleus of the 5(4)-thiazolone series have been previously described by Cook et al. "Jour. Chem. Soc." (1949), pages 1435–7, and in "The Chemistry of Penicillin," Princeton University Press (1949), page 803. (For a further description, see the copending application Serial No. 211,566, filed February 17, 1951, in the names of Per Aubert and Edward B. Knott, now U. S. Patent 2,692,829, issued October 26, 1954, and my copending application Serial No. 224,714, filed May 5, 1951, now U. S. Patent 2,691,581, issued October 12, 1954.)

The intermediates represented by Formula II above can advantageously be prepared by heating together a compound selected from those represented by the following general formula:

VI

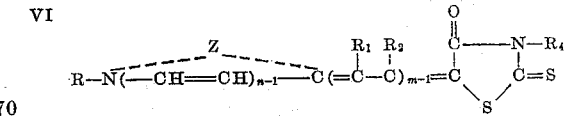

wherein R, $R_1$, $R_2$, $R_4$, m, n, and Z each have the values given above, with an alkyl salt, such as those represented by the following general formula:

VIa     $R_5-X$

Example 1.—2 - [2 - (3 - carbethoxymethyl - 4 - oxo - 2-
thiono - 5 - thiazolidylidene) - 2 - ethoxyethylidene] - 4-
[(3 - ethyl - 2(3) - benzothiazolylidene)ethylidene]-
3 - methyl - 5 - thiazolidone

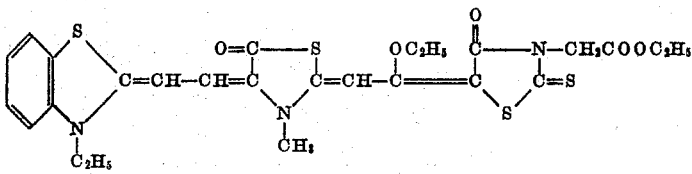

wherein $R_5$ and X each have the values given above. Such a process has been previously described in Fry et al. U. S. Patent 2,388,963, issued November 13, 1945, and Brooker U. S. Patent 2,454,629, issued November 23, 1948. The intermediates represented by Formula VI above are well known, as well as the methods of making them. For example, Kendall U. S. Patent 2,265,908, issued December 9, 1941, describes a method of making dyes of the type represented by Formula VI.

The intermediates represented by Formula IIa above can advantageously be prepared by heating together a compound selected from those represented by the following general formula:

VII

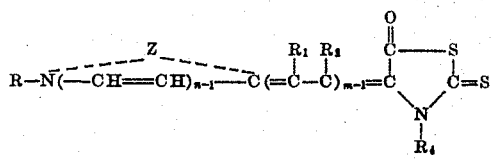

wherein R, $R_1$, $R_2$, $R_4$, m, n, and Z each have the values given above, with an alkyl salt, such as those represented by Formula VIa above. Alternatively, the intermediates represented by Formula IIa above can be prepared by heating together a compound selected from those represented by the following general formula:

VIII

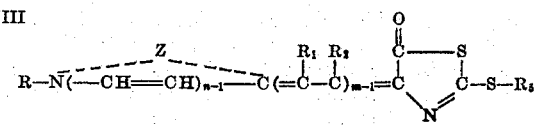

wherein R, $R_1$, $R_2$, $R_5$, m, n, and Z each have the values given above, with an alkyl salt, such as those represented by the following general formula:

VIIIa    $R_4$—X wherein $R_4$ has the values given above. Methods of making the intermediates represented by Formula IIa above have been previously described in the copending application of Per Aubert, Roy A. Jeffreys, and Edward B. Knott, Serial No. 220,332, filed March 2, 1951, now U. S. Patent 2,656,351, issued November 20, 1953. Intermediates represented by Formulas VII and VIII have been previously described in the copending applications Serial No. 211,566, filed February 17, 1951, of Per Aubert and Edward B. Knott and Serial No. 203,526, filed December 29, 1950 (now U. S. Patent 2,656,353, issued November 20, 1953), of Roy A. Jeffreys and Edward B. Knott.

The following examples will serve to illustrate more fully the manner whereby I practice my invention.

2.4 g. of 4-[(3-ethyl-2(3)-benzothiazolylidene)ethylidene]-2-ethylthio - 5(4) - thiazolone methomethylsulfate, 1.5 g. of 3-carbethoxymethyl - 5 - (α - ethoxyethylidene)-rhodanine, 10 cc. of ethanol, and 0.9 cc. of triethylamine were heated on the steam bath for 5 minutes. The dye which rapidly separated was collected hot and washed well with ethanol. There was thus obtained 1.0 g. of dye in the form of dark green crystals, having a melting point of 241° C. after recrystallization from a pyridine-ethanol mixture. It sensitized a gelatino silver chlorobromide emulsion with maxima at 645 and 700 mu and a gelatino silver bromiodide emulsion with a maximum at 735 mu.

The 3-carbethoxymethyl-5-(α-ethoxyethylidene)-rhodanine used in the above example was obtained as follows:

(a) 3-carbethoxymethylrhodanine (4.38 g.), ethyl orthoacetate (6.0 cc.), and acetic anhydride (25.0 cc.) were refluxed for one hour and the solvents removed. There were thus obtained 4.9 g. of residual solid (yield= 85% of theory) as silky, buff needles melting at 105° C. on recrystallization from ligroin.

(b) 3-carboxymethylrhodanine (28.65 g.), ethylorthoacetate (96.0 cc.), and acetic anhydride (300 cc.) were refluxed for one hour and the solvents removed. n-Propanol (50.0 cc.) was added to dissolve the residue and the solution chilled. There were thus obtained 15.8 g. of product in the form of yellow needles melting at 104– 105° C. on recrystallization from isopropanol. The yield was 36% of theory.

Example 2.—2 - [2 - (3 - carbethoxymethyl - 4 - oxo - 2-
thiono - 5 - thiazolidylidene) - 2 - ethoxyethylidene]-
4 - [(3 - ethyl - 2(3) - benzoxazolylidene)ethylidene]-
3 - methyl - 5 - thiazolidone

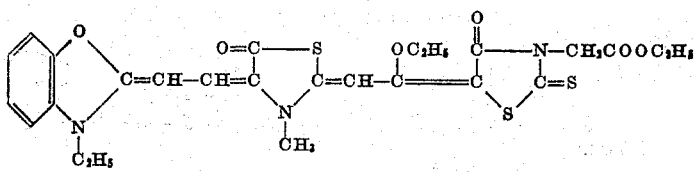

1.65 g. of 4-[(3-ethyl-2(3)-benzoxazolylidene)ethylidene]-2-ethylthio-5(4)-thiazolone and 1.0 g. of methyl p-toluenesulfonate were fused at 125–130° C. for 60 minutes. There were then added 1.5 g. of 3-carbethoxymethyl-5-(α-ethoxyethylidene)rhodanine, 10 cc. of ethanol, and 0.8 cc. of triethylamine. The mixture was heated on the steam bath for 5 minutes, a thick dye meal separating rapidly, which was collected and washed with ethanol. The dye thus obtained weighed 0.5 g. and was obtained as brilliant green crystals melting at 231° C. from benzene. It sensitized a gelatino silver chlorobromide emulsion with maxima at 645 and 700 mu and a gelatino silver bromiodide emulsion with a maximum at 700 mu.

Example 3.—2 - [2 - (3 - carbethoxymethyl - 4 - oxo - 2-thiono - 5 - thiazolidylidene) - 2 - ethoxyethylidene] - 5-[(3 - ethyl - 2(3) - benzothiazolylidene)ethylidene] - 3-ethyl - 4 - thiazolidone

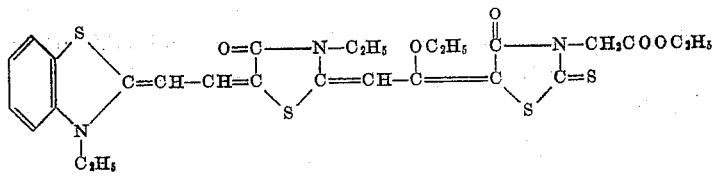

1.75 g. of 5-[(3-ethyl-2(3)-benzothiazolylidene)ethylidene]-3-ethyl-4(5)-thiazolidone and 1.0 g. of methyl p-toluenesulfonate were fused at 130° C. for one hour. The solid quaternary salt was broken up, and 1.5 g. of 3-carbethoxymethyl-5-(α - ethoxyethylidene) - rhodanine, 10.0 cc. of ethanol, and 0.8 cc. of triethylamine were added and heated for 5 minutes on the steam bath. The dye (1.5 g.) was cooled and washed with ethanol. After two recrystallizations from benzene-ethanol, it formed olive-green leaflets and had a melting point of 197° C. It sensitized a gelatino silver chlorobromide emulsion with maxima at 590 and 700 mu and a gelatino silver bromiodide emulsion with maxima at 580 and 700 mu.

Example 4.—2 - [2 - (3 - carbethoxymethyl - 4 - oxo - 2-thiono - 5 - thiazolidylidene) - 2 - ethoxyethylidene] - 5-[(3 - ethyl - 2(3) - benzoxazolylidene)ethylidene] - 3-ethyl - 4 - thiazolidone

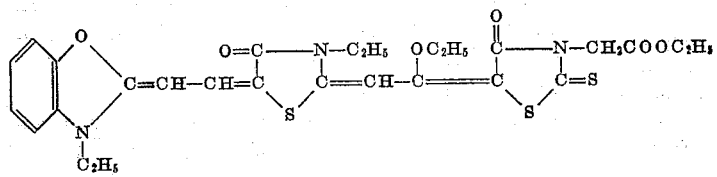

1.7 g. of 5-[(3-ethyl-2(3)-benzoxazolylidene)ethylidene]-3-ethyl-4(5)-thiazolidone and 1.0 g. of methyl p-toluenesulfonate were fused at 130° C. for one hour. The solid was broken up, and 1.5 g. of 3-carbethoxymethyl-5-(α-ethoxyethylidene)rhodanine, 10 cc. of ethanol and 0.8 cc. of triethylamine were added and heated on the steam bath for 5 minutes. The dye (1.2 g.) was collected in the form of olive green crystals and it had a melting point of 223° C. after two recrystallizations from benzene. It sensitized a photographic silver chlorobromide emulsion with maxima at 630 and 690 mu and a photographic silver bromiodide emulsion with maxima at 580 and 710 mu.

Example 5.—2 - [2 - ethoxy - 2 - (2 - ethylthio - 5 - oxo-4 - thiazolinylidene)ethylidene] - 4 - [(3 - ethyl - 2(3)-benzothiazolylidene)ethylidene] - 3 - methyl - 5 - thiazolidone

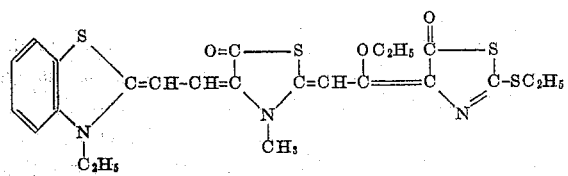

1.0 g. of N-dithiocarbethoxyglycine, 10.0 cc. of acetic anhydride and 5.0 cc. of ethyl orthoacetate were heated on the steam bath for one hour, at the end of which time the solvents were removed under reduced pressure. To the residual 4-(α-ethoxyethylidene)-2-ethylthio - 5(4) - thiazolone was added 2.4 g. of the quaternized merocyanine dye used in Example 1, together with 10.0 cc. of ethanol and 0.8 cc. of triethylamine. The whole was then heated on the steam bath for two minutes and the dye which separated rapidly was collected and washed with ethanol. The dye (0.5 g.) formed soft, green needles melting at 251° C. after two recrystallizations from benzene-ethanol.

It sensitized a gelatino silver chlorobromide emulsion with maxima at 640 and 710 mu.

Example 6.—2 - [2 - ethoxy - 2 - (2 - ethylthio - 5 - oxo-4 - thiazolinylidene)ethylidene] - 5 - [(3 - ethyl - 2(3)-benzothiazolylidene)ethylidene] - 3 - ethyl - 4 - thiazolidone

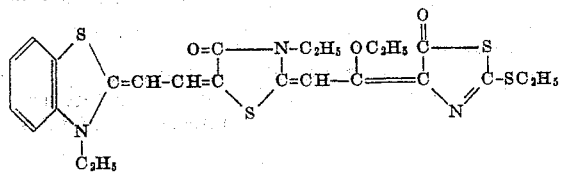

1.0 g. of N-dithiocarbethoxyglycine was treated as in Example 5. The merocyanine dye of Example 3 (1.75 g.) was quaternized as described in that example and then mixed together with the residual product treated according to Example 5. The mixture was then heated for 5 minutes in 10.0 cc. of ethanol and 0.8 cc. of triethylamine. The dye (0.9 g.) after an ethanol wash formed glossy, dark-green needles melting at 227° C., after two recrystallizations from benzene-ethanol. It sensitized a gelatino silver chlorobromide emulsion with maxima at 540 and 690 mu and a photographic silver bromiodide emulsion with a maximum extending to 710 mu.

Example 7.—2-[2-ethoxy-2(5-oxo-2-phenyl-4-oxazolinylidene)ethylidene] - 4 - [(3 - ethyl - 2(3) - benzothiazolylidene)ethylidene]-3-methyl-5-thiazolidone

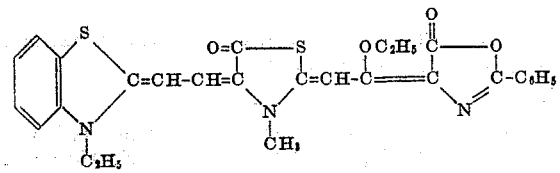

1.42 g. of the quaternized merocyanine dye of Example 1, 0.7 g. of 4-(α-ethoxyethylidene)-2-phenyl-5(4)-oxazolone, 10.0 cc. of ethanol and 0.5 cc. of triethylamine were heated on the steam bath for 5 minutes. The dye (0.5 g.) after an ethanol wash formed flat, soft, bright green needles melting at 277° C. after two recrystallizations from pyridine-ethanol. It sensitized a gelatino silver chlorobromide emulsion with a maximum at 700 mu.

Example 8.—2-[2-(3-carbethoxymethyl-4-oxo-2-thiono-5 - thiazolidylidene) - 2 - ethoxyethylidene] - 5 - [(4,5 - diphenyl - 3 - ethyl - 2(3) - thiazolylidene)-ethylidene] - 3 - ethyl - 4 - thiazolidone

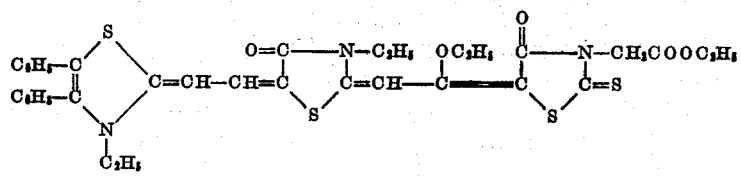

1.5 g. of 5-[(4,5-diphenyl-3-ethyl-2(3)-thiazolylidene) ethylidene]-3-ethyl-4-thiazolidone and 0.85 g. of methyl p-toluenesulfonate were fused at 130° C. for 45 minutes. There were then added 1.0 g. of 3-carbethoxymethyl-5-(α-ethoxyethylidene)rhodanine, 15 cc. of ethanol, and 0.6 cc. of triethylamine, and the whole refluxed for two minutes. The dye (1.2 g.) after an ethanol wash formed soft, glossy, green needles melting at 232° C. after two recrystallizations from benzene-ethanol. It sensitized a gelatino silver chlorobromide emulsion with maxima at 690 and 740 mu and a gelatino silver bromiodide emulsion with a maximum extending to 800 mu.

1.2 g. of 5-[(3-ethyl-2(3)-benzothiazolylidene)ethylidene]-3-phenyl-4-thiazolidone and 0.7 cc. of dimethyl-sulfate were fused for 5 minutes at 140° C. The solid quaternary salt was then reduced to a powder, 0.9 g. of 3 - carbethoxymethyl - 5 - (α - ethoxyethylidene) - rhodanine, 15.0 cc. of ethanol and 0.6 cc. of triethylamine were added and the whole heated for 10 minutes on the steam bath. The dye (1.2 g.) was washed with ethanol until the washings were blue and then recrystallized twice from pyridine-ethanol to give olive-green needles melting at 236° C. It sensitized a gelatino silver chlorobromide emulsion with maxima at 620 and 690 mu and Example 9.—2-[2-(3-carbethoxymethyl-4-oxo-2-thiono-5-thiazolidylidene) - 2 - ethoxyethylidene] - 4 - [(4,5 - diphenyl - 3 - ethyl - 2(3) - thiazolylidene)ethylidene] - 3 - methyl - 5 - thiazolidone

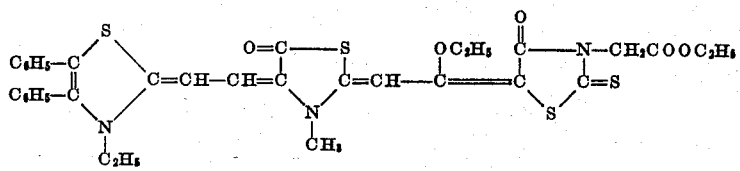

1.5 g. of 4-[(4,5-diphenyl-3-ethyl-2(3)-thiazolylidene)ethylidene]-2-ethylthio-5(4)-thiazolone and 0.7 g. of methyl p-toluenesulfonate were fused at 140° C. for 45 minutes. There were then added 1.0 g. of 3-carbethoxymethyl-5-(α-ethoxyethylidene)-rhodanine, 15.0 cc. of ethanol, and 0.6 cc. of triethylamine and the whole refluxed on the steam bath for 3 minutes. The bronze crystalline dye (0.8 g.) was boiled together with ethanol several times to remove a magenta-colored dye. The bronze crystals were then dissolved in hot benzene but crystallized out immediately as green needles. After two recrystallizations from pyridine, it formed green needles melting at 249° C. with some softening at 190° C. It sensitized a gelatino silver chlorobromide emulsion with a maximum at 750 mu.

a gelatino silver bromiodide emulsion with a maximum at 690 mu.

Example 11.—2-[2-(3-carbethoxymethyl-4-oxo-2-thiono-5 - thiazolidylidene) - 2 - ethoxyethylidene] - 5 - (3 - ethyl - 4,5 - diphenyl - 2(3) - thiazolylidene) - 3 - ethyl - 4 - thiazolidone

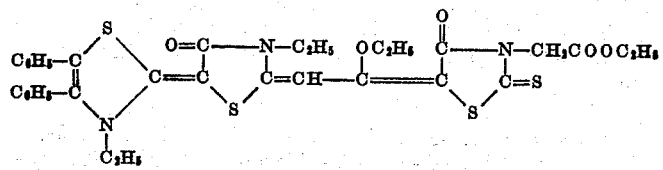

1.3 g. of 5-(4,5-diphenyl-3-ethyl-2(3)-thiazolylidene)-3-ethyl-4-thiazolidone and 0.6 g. of methyl p-toluenesulfonate were fused at 140° C. for 30 minutes. There were then added 0.9 g. of 3-carbethoxymethyl-5-(α-ethoxyethylidene)rhodanine, 20.0 cc. of ethanol, and 0.5 cc. of triethylamine and the whole refluxed for 15 minutes. The dye (2.0 g.) formed mauve microcrystals melting at 250° C. after recrystallization from pyridine-ethanol. It sensitized a gelatino silver chlorobromide emulsion with a maximum at 625 mu and a gelatino silver bromiodide emulsion with a maximum at 620 mu.

The following examples describe various dyes embraced by Formula I above, the dyes being prepared in sub- Example 10.—2-[2-(3-carbethoxymethyl-4-oxo-2-thiono-5 - thiazolidylidene) - 2 - ethoxyethylidene] - 5 - [(3 - ethyl - 2(3) - benzothiazolylidene)ethylidene] - 3 - phenyl - 4 - thiazolidone

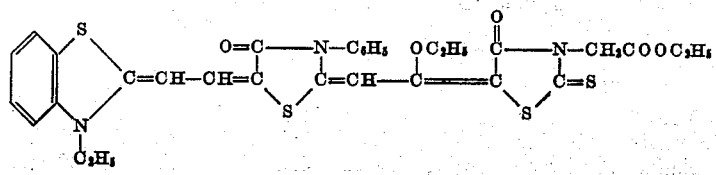

stantially the identical manner illustrated in Examples 1 to 11. The dyes were obtained by condensing the intermediate selected from Formula II or IIa above with an intermediate of Formula III as hereinbefore described. The condensations were carried out in ethanol solution using triethylamine as the condensing agent.

*Example 12.—2-[2-(3-carbethoxymethyl-4-oxo-2-thiono-5 - thiazolidylidene) - 2 - ethoxyethylidene] -3 - ethyl - 5 - [(1,3,3 - trimethyl - 2(1) - indolylidene)ethylidene]-4-thiazolidone*

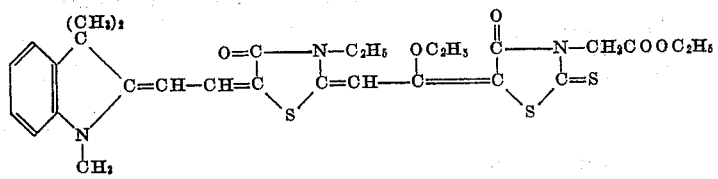

This dye was obtained as green flakes with a melting point of 212° C. The yield was 33%. It sensitized a gelatino silver chlorobromide emulsion with maxima at 630 and 680 mu and a gelatino silver bromiodide emulsion with maxima at 600 and 690 mu.

*Example 13.—3 - carbethoxymethyl - 2 - [2 - (3 - carbethoxymethyl - 4 - oxo - 2 - thiono - 5 - thiazolidylidene) - 2-ethoxyethylidene] - 5 - [(3 - ethyl - 2(3) - benzoxazolylidene)ethylidene]-4-thiazolidone*

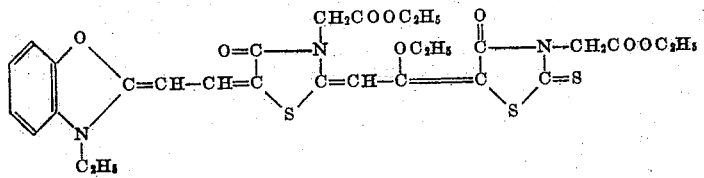

This dye was obtained in the form of violet-brown threads in 31% yield. It had a melting point of 189° C. and sensitized a gelatino silver chlorobromide emulsion with maxima at 610 and 690 mu and a gelatino silver bromiodide emulsion with maxima at 620 and 690 mu.

*Example 14.—3 - carbethoxymethyl - 2 - [2 - (3 - carbethoxy-methyl - 4 - oxo - 2 - thiono - 5 - thiazolidylidene) - 2 - ethoxyethylidene] - 5 - [(3 - ethyl - 2(3) - benzothiazolylidene)ethylidene]-4-thiazolidone*

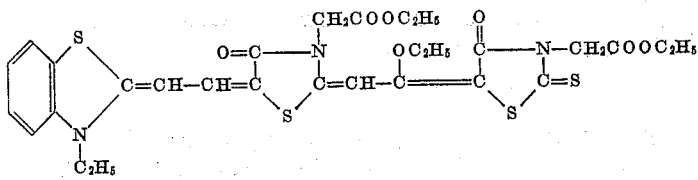

This dye was obtained in 61% yield as green threads having a melting point of 221° C. It sensitized a gelatino silver chlorobromide emulsion with a maximum at 680 mu and a gelatino silver bromiodide emulsion with a maximum at 690 mu.

*Example 15.—3 - carbethoxymethyl - 2 - [2 - (3 - carbethoxymethyl - 4 - oxo - 2 - thiono - 5 - thiazolidylidene )- 2 - ethoxy - ethylidene] - 5 - [(1 - ethyl - 2(1) -quinolylidene)ethylidene]-4-thiazolidone*

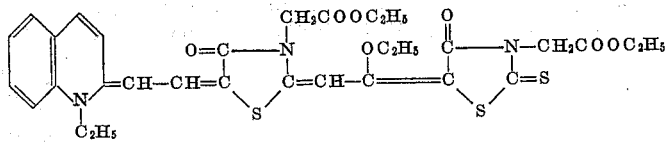

This dye was obtained as green flakes in 40% yield. It had a melting point of 216° C. and sensitized a gelatino silver chlorobromide emulsion with maxima at 635 and 730 mu and a gelatino silver bromiodide emulsion with maxima at 685 and 730 mu.

*Example 16.—3 - carbethoxymethyl - 2 - [2 - (3 - carbethoxymethyl - 4 - oxo - 2 - thiono - 5 - thiazolidylidene) - 2 - ethoxyethylidene] - 5 - [(3 - methyl - 2(3) - thiazolinylidene)ethylidene]-4-thiazolidone*

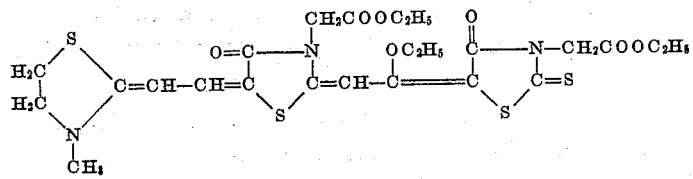

This dye was obtained in 33% yield as green crystals having a melting point of 211° C. It sensitized a gelatino silver chlorobromide emulsion with maxima at 630 and 690 mu and a gelatino silver bromiodide emulsion with a maximum at 640 mu.

*Example 19.—3 - carbethoxymethyl-2-[2-(3-carbethoxymethyl-4-oxo-2 - thiono-5-thiazolidylidene)-2-ethoxyethylidene] - 5 - [1-(1-ethyl-2(1)-β-naphthothiazolylidene)-2-propylidene]-4-thiazolidone*

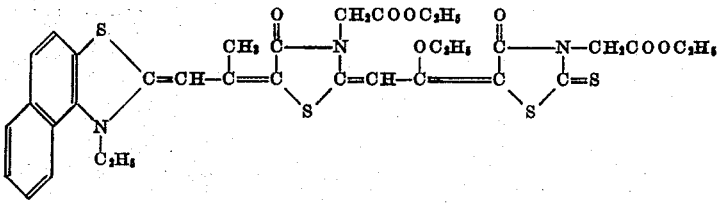

This dye was obtained in 23% yield in the form of

*Example 17.—3 - carbethoxymethyl - 2 - [2 - (3 - carbethoxymethyl - 4 - oxo - 2 - thiono - 5 - thiazolidylidene) - 2 - ethoxyethylidene] - 5 - 2 - [(3 - methyl - 2(3) - thiazolinylidene)-1-propylidene]-4-thiazolidone*

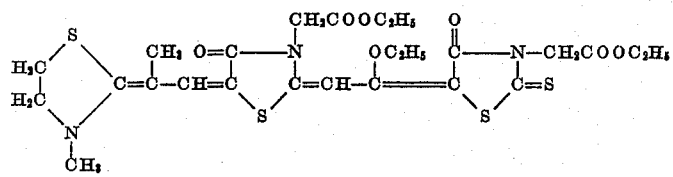

This dye was obtained in 30% yield in the form of green crystals having a melting point of 194–195° C. It sensitized a gelatino silver chlorobromide emulsion with a maximum at 650 mu and a gelatino silver bromiodide emulsion with a maximum at 670 mu.

green flakes having a melting point of 226° C. It sensitized a gelatino silver chlorobromide emulsion with a maximum at 710 mu and a gelatino silver bromiodide emulsion with a maximum at 730 mu.

*Example 20.—3-carbethoxymethyl - 2 - [2-(3-carbethoxymethyl-4-oxo - 2 - thiono-5-thiazolidylidene)-2-ethoxyethylidene]-5-[(1 - ethyl - 4(1)-quinolylidene) ethylidene]-4-thiazolidone*

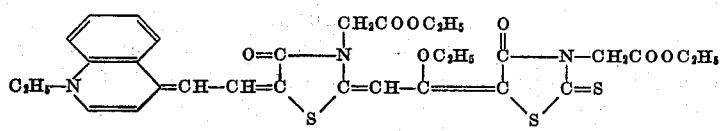

This dye was obtained in 30% yield in the form of

*Example 18.—3 - carbethoxymethyl - 2 - [2 - (3 - carbethoxymethyl - 4 - oxo - 2 - thiono - 5 - thiazolidylidene) - 2 - ethoxyethylidene] - 5 - [(1 - ethyl - 2(1) - β - naphthothiazolylidene)ethylidene]-4-thiazolidone*

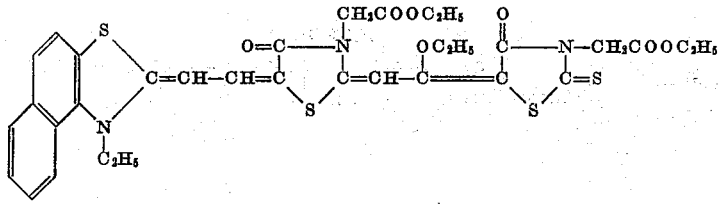

This dye was obtained in 40% yield in the form of green powder having a melting point of 230° C. It sensitized a gelatino silver chlorobromide emulsion with a maximum at 690 mu and a gelatino silver bromiodide emulsion with a maximum at 700 mu.

green-gold needles having a melting point of 210° C. It sensitized a gelatino silver chlorobromide emulsion with a maximum at 770 mu and a gelatino silver bromiodide emulsion with a maximum at 780 mu.

*Example 21.—3-carbethoxymethyl - 2 - [2-(3-carbethoxymethyl - 4 - oxo-2-thiono-5-thiazolidylidene)-2-ethoxyethylidene]-5-[(3 - ethyl-2(3) - benzoselenazolylidene) ethylidene]-4-thiazolidone*

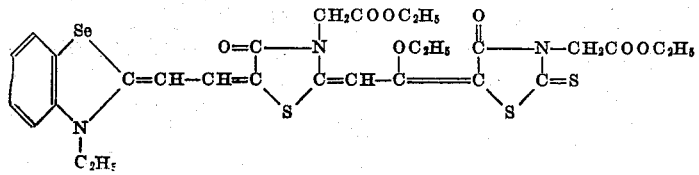

This dye was obtained in 37% yield in the form of green needles having a melting point of 221° C. It sensitized a gelatino silver chlorobromide emulsion with a maximum at 670 mu and a gelatino silver bromiodide emulsion with a maximum at 680 mu.

This dye was obtained in 28% yield in the form of green crystals and had a melting point of 212° C. It sensitized a gelatino silver chlorobromide emulsion with a maximum at 690 mu and a gelatino silver bromiodide emulsion with a maximum at 700 mu.

*Example 25.*—*5-[(4,5-diphenyl-3-ethyl-2(3)-oxazolylidene)ethylidene] - 3 - carbethoxymethyl-2-[2-(3-carbethoxymethyl-4-oxo-2-thiono - 5 - thiazolidylidene)-2-ethoxyethylidene]-4-thiazolidone*

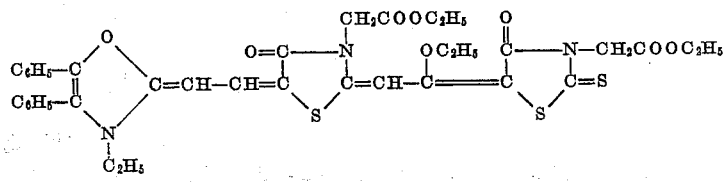

*Example 22.*—*3-carbethoxymethyl-2-[2-(3-carbethoxymethyl-4-oxo-2-thiono - 5 - thiazolidylidene)-2-ethoxyethylidene]-5-[(1-ethyl-2(1)-pyridylidene)ethylidene]-4-thiazolidone*

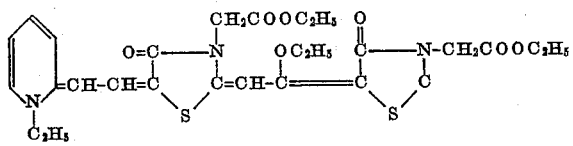

This dye was obtained in 62% yield in the form of green threads having a melting point of 179° C. It sensitized a gelatino silver chlorobromide emulsion with a maximum at 710 mu and a gelatino silver bromiodide emulsion with maxima at 690 and 740 mu.

This dye was obtained in 38% yield in the form of green-bronze crystals and had a melting point of 151° C. It sensitized a gelatino silver chlorobromide emulsion with maxima at 570 and 680 mu and a gelatino silver bromiodide emulsion with a maximum at 690 mu.

*Example 23.*—*3-carbethoxymethyl-2-[2-(3-carbethoxymethyl-4-oxo-2-thiono - 5 - thiazolidylidene)-2-ethoxyethylidene]-5-[(1-ethyl-4(1)-pyridylidene)ethylidene]-4-thiazolidone*

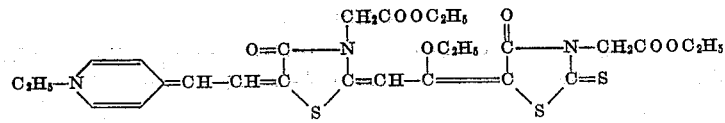

This dye was obtained in 33% yield in the form of green flakes having a melting point of 213° C. It sensitized a gelatino silver chlorobromide emulsion with a maximum at 740 mu and a gelatino silver bromiodide emulsion with a maximum at 740 mu.

*Example 26.*—*5 - [(4,5 - diphenyl - 3 - ethyl - 2(3)-thiazolylidene)ethylidene] - 3 - carbethoxymethyl - 2-[2 - (3 - carbethoxymethyl - 4 - oxo - 2 - thiono - 5-thiazolidylidene) - 2 - ethoxyethylidene] - 4 - thiazolidone*

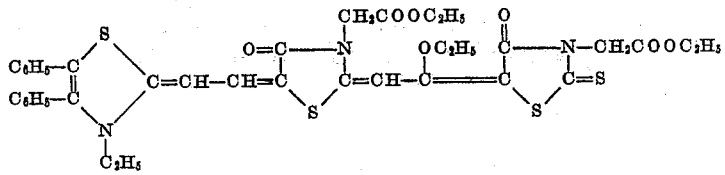

This dye was obtained in 37% yield in the form of green needles and had a melting point of 192° C. It sensitized a gelatino silver chlorobromide emulsion with

*Example 24.*—*5-[(1,3-diethyl-2(3)-benzimidazolylidene)ethylidene] - 3 - carbethoxymethyl-2-[2-(3-carbethoxymethyl-4-oxo-2-thiono - 5 - thiazolidylidene)-2-ethoxyethylidene]-4-thiazolidone*

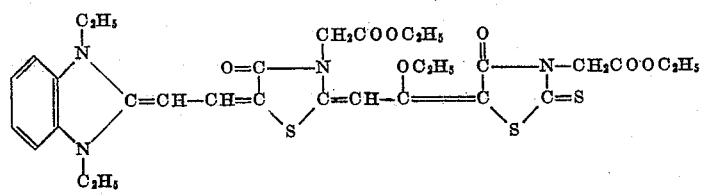

a maximum at 680 mu and a gelatino silver bromiodide emulsion with maxima at 685 and 735 mu.

*Example 27. — 3-allyl-2-[2-(3-allyl-4-oxo-2-thiono-5-thiazolidylidene)-2-ethoxyethylidene]-5-[(3 - ethyl - 2(3)-benzothiazolylidene)ethylidene]-4-triazolidone*

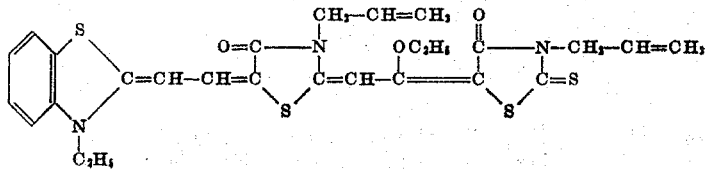

This dye was obtained in 39% yield in the form of green needles and had a melting point of 227° C. It sensitized a gelatino silver chlorobromide emulsion with a maximum at 690 mu and a gelatino silver bromiodide emulsion with a maximum at 690 mu.

*Example 28. — 3-allyl-2-[2-(3-allyl-4-oxo-2-thiono-5-thiazolidylidene)-2-ethoxyethylidene]-5-[1-(1-ethyl-2(1)-β-naphthothiazolylidene)-2-butylidene]-4-thiazolidone.*

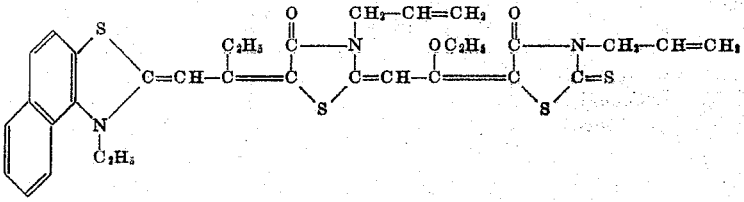

This dye was obtained in 39% yield in the form of green needles and had a melting point of 209° C. It sensitized a gelatino silver chlorobromide emulsion with a maximum at 735 mu.

*Example 29. — 3-allyl-2-[2-(3-ethyl-4-oxo-2-thiono - 5-thiazolidylidene) - 2-ethoxyethylidene]-5-[1-(3-ethyl-2(3)-benzothiazolylidene)-2-propylidene] - 4 - thiazolidone*

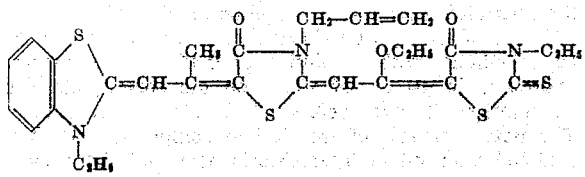

This dye was obtained in 10% yield in the form of green needles and had a melting point of 212° C. It sensitized a gelatino silver chlorobromide emulsion with a maximum at 685 mu and a gelatino silver bromiodide emulsion with maxima at 640 and 680 mu.

*Example 30. — 3-allyl-2-[2-(3-allyl-4-oxo-2-thiono-5-thiazolidylidene)-2-ethoxyethylidene] - 5-[1-(3-ethyl-2(3)-benzothiazolylidene)-2-butylidene]-4-thiazolidone.*

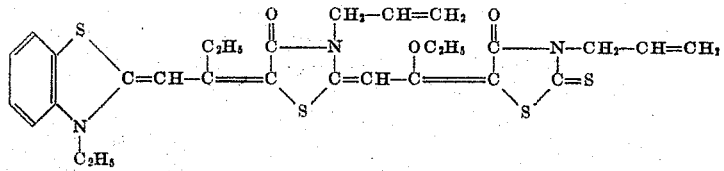

This dye was obtained in 45% yield in the form of green needles and had a melting point of 209° C. It sensitized a gelatino silver chlorobromide emulsion with a maximum at 690 mu and a gelatino silver bromiodide emulsion with a maximum at 690 mu.

*Example 31. — [2-(3 - carbethoxymethyl - 4 - oxo - 2-thiono-5-thiazolidylidene) - 2 - methoxyethylidene]-3-ethyl-5-[(3-ethyl-2(3)- benzoxazolylidene)ethylidene]-4-thiazolidone.*

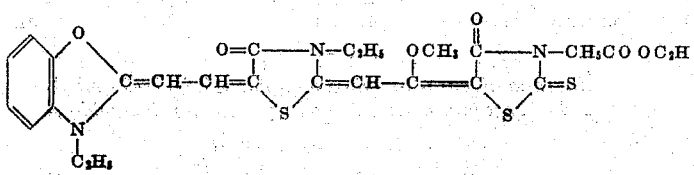

This dye was obtained in 51% yield in the form of green needles and had a melting point of 244° C. It sensitized a gelatino silver chlorobromide emulsion with a maximum at 690 mu and a gelatino silver bromiodide emulsion with a maximum at 690 mu.

*Example 32.* — *3-allyl-2-[2-(3-allyl-4-oxo-2-thiono-5-thiazolidylidene)-2-ethoxyethylidene]-5-[1 - ethoxy - 2-(3 - ethyl - 2(3)-benzothiazolylidene)ethylidene]-4-thiazolidone*

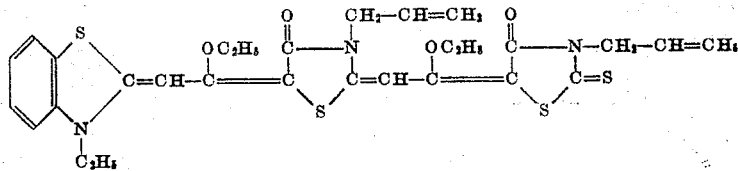

This dye was obtained in 12% yield in the form of green needles and had a melting point of 200° C. It sensitized a gelatino silver chlorobromide emulsion with a maximum at 690 mu and a gelatino silver bromiodide emulsion with a maximum at 690 mu.

*Example 33.* — *2-[2-(3-carbethoxymethyl - 4 - oxo - 2-thiono-5-thiazolidylidene)-2 - methoxyethylidene] - 4-[(3 - ethyl-2(3) - benzothiazolidylidene)ethylidene]-3-methyl-5-thiazolidone*

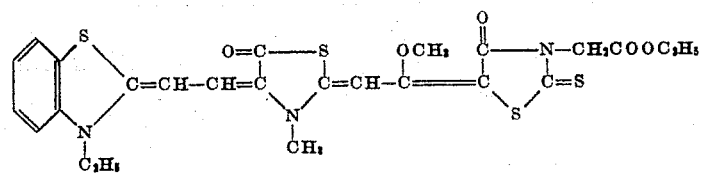

This dye was obtained in 31% yield in the form of green needles and had a melting point of 215° C. It sensitized a gelatino silver chlorobromide emulsion with a maximum at 730 mu and a gelatino silver bromiodide emulsion with a maximum at 730 mu.

*Example 34.* — *2 - [2 - (3-carbethoxymethyl - 4 - oxo - 2-thiono - 5 - thiazolidylidene)-2-methoxyethylidene]-4-[(3-ethyl-2(3)-benzoxazolylidene)ethylidene] - 3-methyl-5-thiazolidone*

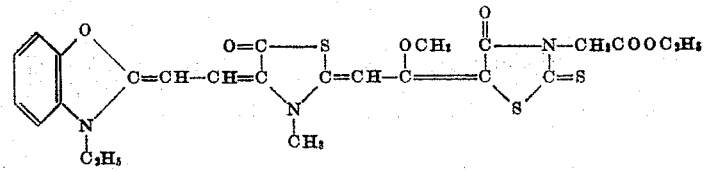

This dye was obtained in 18% yield in the form of green needles and had a melting point of 235° C. It sensitized a gelatino silver chlorobromide emulsion with a maximum at 700 mu and a gelatino silver bromiodide emulsion with a maximum at 710 mu.

*Example 35.* — *3 - allyl -2- [2 - (3-allyl-4-oxo-2-thiono-5-thiazolidylidene)-2-methoxyethylidene]-5-[1-(3 - ethyl-2(3)-benzothiazolylidene)-2-butylidene]-4-thiazolidone*

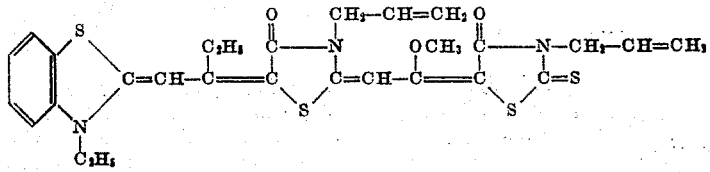

This dye was obtained in 45% yield in the form of green powder and had a melting point of 199° C. It sensitized a gelatino silver chlorobromide emulsion with maxima at 620 and 680 mu and a gelatino silver bromiodide emulsion with maxima at 620 and 680 mu.

It has also been found that the merocarbocyanine dyes containing a chain alkoxyl group, such as the dyes of Formula II above (prior to quarternization) wherein $R_2$ is an alkoxyl group, can be treated with alkali (e. g. sodium, potassium, etc., hydroxides) in aqueous solution to produce dyes containing a chain-carbonyl group. This aspect of my invention is illustrated in the following examples.

*Example 36.*—*3-carboxymethyl-5-(3-ethyl-2(3)-benzothiazolylidene)acetyl-4-hydroxy-2-thionothiazoline*

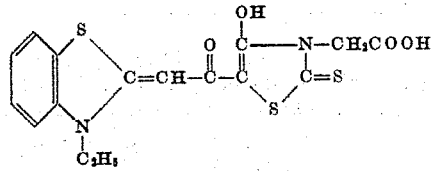

4.0 g. of 2-ethylthiobenzothiazole etho-p-toluenesulfonate, 2.9 g. of 3-carbethoxymethyl-5-(α-ethoxyethylidene)-rhodanine, 20 cc. of ethanol, and 1.5 cc. of triethylamine were refluxed together for 15 minutes and chilled overnight. The precipitated dye weighed 2.8 g. and formed magenta needles on recrystallization from a benzene-light petroleum mixture. It melted at 127° C.

0.9 g. of the dye obtained above was refluxed in 20 cc. of ethanol with a solution of 0.45 g. of potassium hydroxide in 10 cc. of water on the steam bath for 75 minutes. The red solution had then become orange. The potassium salt of the desired compound was then acidified with dilute hydrochloric acid and the orange dye (0.6 g.) was washed with ethanol and obtained as fine, short, rust-colored needles from ethanol. It melted at 220° C. and sensitized a gelatino silver chlorobromide emulsion with a maximum at 510 mu.

*Example 37.—3 - carboxymethyl - 5 - (1-ethyl-2(1)-quinolylidene)acetyl-4-hydroxy-2-thionothiazoline*

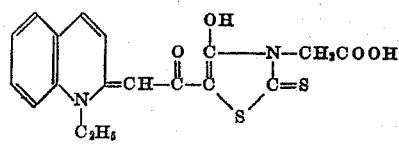

1.35 g. of 3-carbethoxymethyl-5-[1-ethoxy-2-(1-ethyl-2(1)-quinolylidene)ethylidene]rhodanine, 25 cc. of ethanol and 0.7 g. potassium hydroxide in 5 cc. of water were heated on the steam bath for 30 minutes. The orange solution containing the potassium salt of the desired compound was acidified with hydrochloric acid and the dye which slowly crystallized, collected after 24 hours. The dye weighed 0.6 g., representing a yield of 51%. It was obtained as violet needles by dissolving in alcoholic triethylamine and acidifying with acetic acid. It had a melting point of 237° C. and it sensitized a gelatino silver chlorobromide emulsion with a maximum at 520 mu.

*Example 38. — 3-allyl-5-(3-ethyl-2(3)-benzothiazolylidene)acetyl-4-hydroxy-2-thionothiazoline*

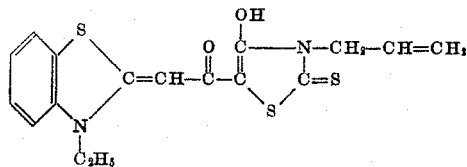

1.2 g. of 3-allyl-5-[1-ethoxy-2-(3-ethyl-2(3)-benzothiazolylidene)ethylidene]rhodanine was covered with 30 cc. of ethanol and a solution of 0.6 g. of potassium hydroxide in 3 cc. of water added and the whole refluxed for one hour. The bright orange solution containing the potassium salt of the desired compound was acidified with dilute acetic acid. The precipitated dye (64%) formed red needles from ethanol. It had a melting point of 199° C. and it sensitized a gelatino silver chlorobromide and a gelatino silver bromiodide emulsion with a maximum at 510 mu.

As shown in a number of the above examples, the new dyes of my invention are useful in spectrally sensitizing photographic silver halide emulsions when incorporated therein. The dyes are especially useful for extending the spectral sensitivity of the customarily employed gelatino silver chloride, gelatino silver chlorobromide, gelatino silver bromide, gelatino silver bromiodide, and gelatino silver chlorobromiodide developing-out emulsions. In several of the foregoing examples, the point of maximum sensitivity of gelatino silver chlorobromide and/or gelatino silver bromiodide emulsions sensitized with my new dyes is pointed out in connection with the description of the properties of certain of the dyes. To prepare emulsions sensitized with one or more of my new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Pyridine or acetone has proved satisfactory as a solvent for most of my new dyes. The dyes are advantageously incorporated in the finished, washed emulsions and should be uniformly distributed throughout the emulsions.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of my new dyes, the following procedure is satisfactory:

A quantity of dye is dissolved in pyridine or acetone (or a mixture of acetone and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of my dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

Photographic silver halide emulsions, such as those listed above, containing the sensitizing dyes of my invention can also contain such addenda as chemical sensitizers (e. g. sulfur sensitizers, such as allyl thiocarbamide, thiourea, allylisothiocyanate, cystine, etc.), various gold compounds, such as potassium chloroaurate, auric trichloride, etc. (see U. S. Patents 2,540,085; 2,597,856; and 2,597,915, for example), various palladium compounds (such as palladium chloride (U. S. 2,540,086), potassium chloropalladate (U. S. 2,598,079), etc.), etc., or mixtures of such sensitizers), antifoggants (e. g. benzotriazole, nitrobenzimidazole, 5-nitroindazole, etc. (see Mees—"The Theory of the Photographic Process," Macmillan Pub., pg. 460), or mixtures thereof), hardeners (e. g. formaldehyde (U. S. 1,763,533), chrome alum (U. S. 1,763,533), glyoxal (Ger. 538,713), dibromacrolein (Br. 406,750), etc.), color couplers (e. g. such as those described in U. S. Patent 2,423,730, Spence and Carroll U. S. application 771,380, filed August 29, 1947, etc.), or mixtures of such addenda. Dispersing agents for color couplers, such as substantially water-insoluble, high boiling crystalloidal materials, such as those set forth in U. S. Patents 2,322,027 and 2,304,940, can also be employed in the above-described emulsions.

What I claim as my invention and desire secured by Letters Patent of the United States is:

1. A polymethine dye selected from those represented by the following general formula:

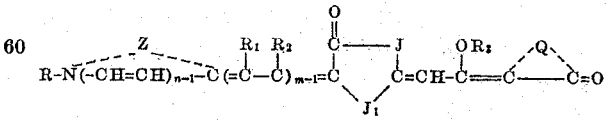

wherein R and $R_3$ each represents an alkyl group of the formula $C_qH_{2q+1}$ wherein $q$ represents a positive integer of from 1 to 3, $R_1$ represents a member selected from the group consisting of a hydrogen atom and an alkyl group of the formula $C_dH_{2d+1}$ wherein $d$ represents a positive integer of from 1 to 3, $R_2$ represents a member selected from the group consisting of a hydrogen atom, an alkyl group of the formula $C_qH_{2q+1}$ wherein $q$ represents a positive integer of from 1 to 3, a phenyl group, a tolyl group, and an alkoxyl group containing from 1 to 2 carbon atoms and at least one of the groups selected from $R_1$ and $R_2$ is a hydrogen atom, Z represents the non-metallic atoms necessary to complete a heterocyclic nucleus selected from the group consisting of those of the thiazole series, those of the benzothiazole series, those of the naphthothiazole series, those of the oxazole series, those of the benzoxazole series, those of the naphthoxazole series, those of the selenazole series, those of the benzoselenazole series, those of the naphthoselenazole series, those of the thiazoline series, those of the thianaphtheno-7′,6′,4,5-thiazole series, those of the 2-quinoline series, those of the 4-quinoline series, those of the 1-isoquinoline series, those of the 3-isoquinoline series, those of the benzimidazole series, those of the 3,3-dialkylindolenine series, and those of the pyridine series, J and J₁ together represent the non-metallic atoms necessary to complete a thiazolidone nucleus, and $m$ and $n$ each represents a positive integer of from 1 to 2, and Q represents the non-metallic atoms necessary to complete a heterocyclic nucleus containing five atoms in the heterocyclic ring, three of said atoms being carbon atoms, one of said atoms being a nitrogen atom and the remaining atom being an atom selected from the group consisting of a nitrogen atom, an oxygen atom, and a sulfur atom.

2. A polymethine dye as defined in claim 1 wherein $R_1$ represents a hydrogen atom and $m$ is 2.

3. A polymethine dye as defined in claim 1 wherein $R_2$ represents an alkyl group and $m$ is 2.

4. The polymethine dye represented by the following formula:

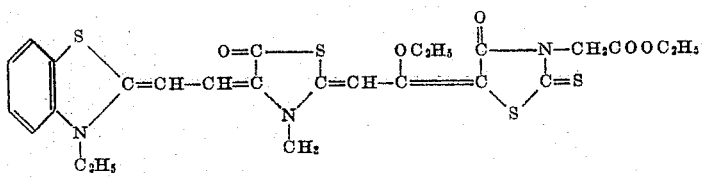

5. The polymethine dye represented by the following formula:

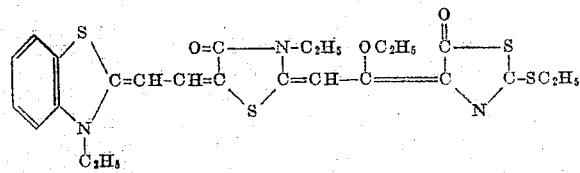

6. The polymethine dye represented by the following formula:

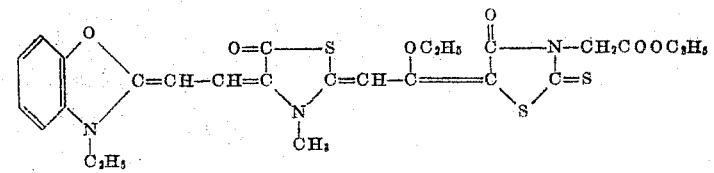

7. The polymethine dye represented by the following formula:

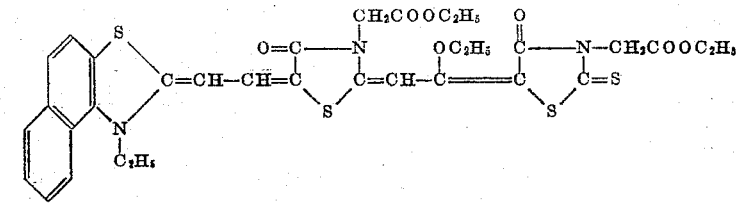

8. The polymethine dye represented by the following formula:

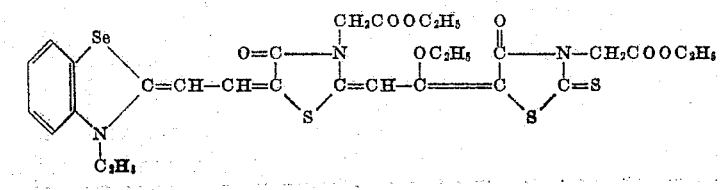

9. A process for preparing a polymethine dye comprising condensing a compound selected from the group consisting of those represented by the following two general formulas:

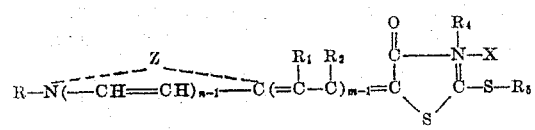

and

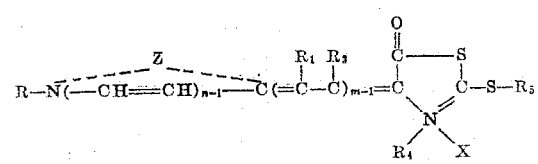

wherein R, $R_4$, and $R_5$ each represents an alkyl group containing from 1 to 4 carbon atoms, $R_1$ represents a member selected from the group consisting of a hydrogen atom and an alkyl group of the formula $C_dH_{2d+1}$ wherein $d$ represents a positive integer of from 1 to 3, $R_2$ represents a member selected from the group consisting of a hydrogen atom, an alkyl group of the formula $C_qH_{2q+1}$ wherein $q$ represents a positive integer of from 1 to 3, a phenyl group, a tolyl group, and an alkoxyl group containing from 1 to 2 carbon atoms and at least one of the groups selected from $R_1$ and $R_2$ is a hydrogen atom, Z represents the non-metallic atoms necessary to complete a heterocyclic nucleus selected from the group consisting of those of the thiazole series, those of the benzothiazole series, those of the naphthothiazole series, those of the oxazole series, those of the benzoxazole series, those of the naphthoxazole series, those of the selenazole series, those of the benzoselenazole series, those of the naphthoselenazole series, those of the thiazoline series, those of the thianaphtheno-7′,6′,4,5-thiazole series, those of the 2-quinoline series, those of the 4-quinoline series, those of the 1-isoquinoline series, those of the 3-isoquinoline series, those of the benzimidazole series, those of the 3,3-dialkylindolenine series, and those of the pyridine series, X represents an acid radical, and $m$ and $n$ each represents a positive integer of from 1 to 2, together with a compound selected from those represented by the following general formula:

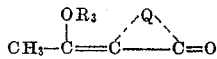

wherein $R_3$ represents an alkyl group and Q represents the non-metallic atoms necessary to complete a heterocyclic nucleus containing five atoms in the heterocyclic ring, three of said atoms being carbon atoms, one of said atoms being a nitrogen atom, and the remaining atom being selected from the group consisting of a nitrogen atom, an oxygen atom and a sulfur atom.

10. A process according to claim 9 wherein the condensation is carried out in the presence of a basic condensing agent.

11. A process according to claim 10 wherein the basic condensing agent is triethylamine.

References Cited in the file of this patent

UNITED STATES PATENTS

| 2,263,018 | Sprague | Nov. 18, 1941 |
| 2,388,963 | Fry | Nov. 13, 1945 |
| 2,454,629 | Brooker | Nov. 23, 1948 |
| 2,478,366 | Brooker | Aug. 9, 1949 |
| 2,494,031 | Brooker | Jan. 10, 1950 |